United States Patent [19]
Gilbert et al.

[11] Patent Number: 6,031,939
[45] Date of Patent: Feb. 29, 2000

[54] METHOD OF OPTIMIZING THE COMPRESSION OF IMAGE DATA, WITH AUTOMATIC SELECTION OF COMPRESSION CONDITIONS

[75] Inventors: Frédéric Gilbert, Viroflay; Edouard Ritz, Paris, both of France

[73] Assignee: Alcatel, Paris, France

[21] Appl. No.: 09/041,744

[22] Filed: Mar. 13, 1998

[30] Foreign Application Priority Data

Mar. 17, 1997 [FR] France ................................. 97 03212

[51] Int. Cl.⁷ ........................................................ G06K 9/36
[52] U.S. Cl. .......................... 382/239; 382/232; 382/238
[58] Field of Search ................................. 382/239, 232, 382/238; 386/109; 241/67

[56] References Cited

U.S. PATENT DOCUMENTS

| 4,075,622 | 2/1978 | Lawrence et al. | 341/67 |
| 5,724,475 | 3/1998 | Kriten | 386/109 |
| 5,917,952 | 6/1999 | Noh | 382/239 |

FOREIGN PATENT DOCUMENTS

| 0512174A1 | 11/1992 | European Pat. Off. | H04L 29/06 |
| 0583107A2 | 2/1994 | European Pat. Off. | G06F 15/64 |

OTHER PUBLICATIONS

Srivastava et al., "Image Compression Based On Optimal Subband Decomposition and Vector Quantization", Circuits and Systems, Proceedings of the 38th Midwest Symposium, vol. 2, pp. 1232–1235, 1996.

Zhuang, "Adaptive Wavelet System for Image Representation", Signal Processing, 3rd International Conference, vol. 1, pp. 291–294, 1996.

J.M. Shapiro, "Smart compression using the embedded zerotree wavelet (EZW) algorithm" Conference Record of the Twenty–Seventh Asilomar Conference on Signals, Systems and Computers (Cat. No. 93CH3312–6), Proceedings of 27th Asilomar Conference on Signals, Systems and Computers, Pacific Grove, CA, USA, 103 Nov. 193, ISBN 0–8186–4120–7, 1993, Los Alamitos, CA, USA, IEEE Comput. Soc. Press, USA, pp. 486–490, vol. 1, XP000463745.

*Primary Examiner*—Jose L. Couso
*Assistant Examiner*—Anh Hong Do
*Attorney, Agent, or Firm*—Sughrue, Mion, Zinn, Macpeak & Seas, PLLC

[57] ABSTRACT

A method of optimizing the compression of image data in accordance with at least one compression objective includes an initialization phase including the steps of compressing a plurality of test samples in accordance with at least two different compression conditions, associating with each test sample at least one item of information characteristic of the content of the sample and at least one measurement of the corresponding compression results and establishing at least one reference function associating at least one of the compression objectives and/or at least one compression result measurement and/or at least one of the items of characteristic information for each of the compression conditions. The method additionally includes a selection phase including for each set of image data to be compressed the steps of determining at least one item of information characteristic of the set of image data to be compressed and selecting the optimal compression condition that maximizes at least one of the compression objectives in accordance with the item or items of characteristic information and the reference functions.

24 Claims, 2 Drawing Sheets

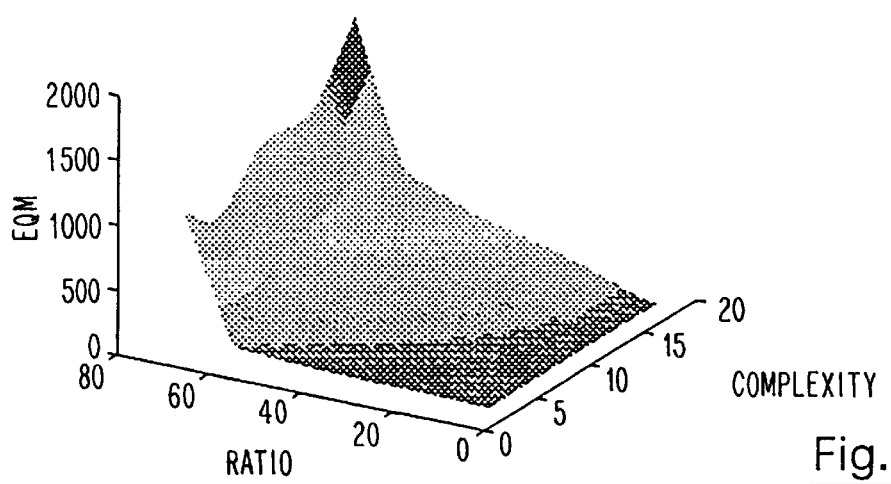
Fig. 4 (JPEG)
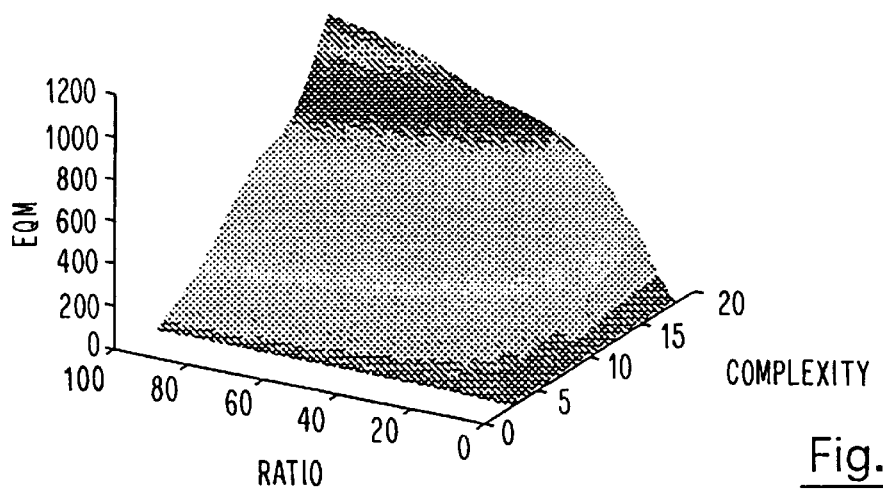
Fig. 5 (EZW)
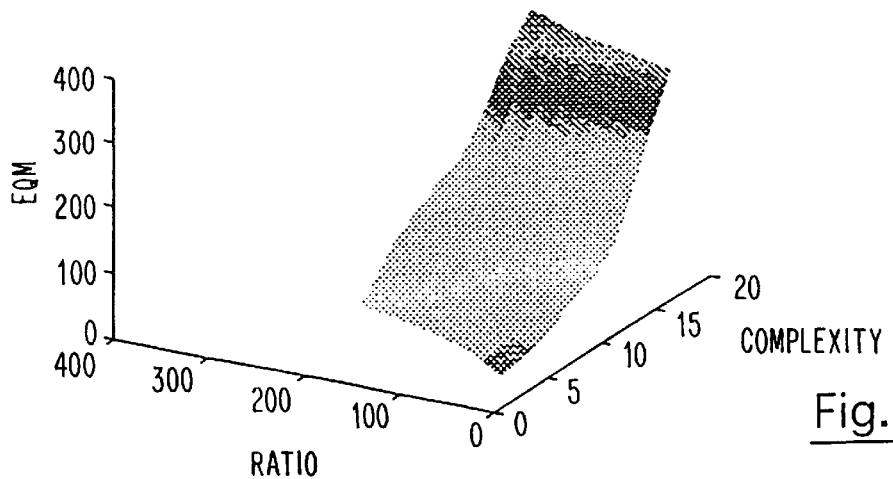
Fig. 6 (FISHER)

METHOD OF OPTIMIZING THE COMPRESSION OF IMAGE DATA, WITH AUTOMATIC SELECTION OF COMPRESSION CONDITIONS

BACKGROUND OF THE INVENTION

1. Field of the Invention

The field of the invention is that of compressing fixed images and moving images. To be more precise, the invention concerns optimizing compression in accordance with one or more criteria chosen by the user.

2. Description of the Prior Art

Image compression is necessary in a very large number of fields, in particular with the aim of obtaining small files and/or files that can be transmitted quickly.

The fast transmission of images, in particular, is becoming essential in many fields of application and the image will assume an ever more dominant place in telecommunications.

All multimedia applications, in particular, require fast transmission of images and high-performance image storage techniques. This imperative is encountered, for example, in fields concerning videophones, video-conferencing, electronic mail, telediagnosis, interactive television (VOD: "Video On Demand" and IVOD: "Interactive VOD") up to televirtual reality. The same applies to remote sensing satellites: the increasing resolution of the instruments means that they have to transmit ever greater quantities of image data.

In all cases new image compression techniques are necessary for improved image storage and transmission, depending on the bit rates available, depending on the transmission speed required given the transmission time required and the degree to which information is lost on transmission that can be tolerated.

The standard compression techniques developed over the last five years (JPEG, MPEG) are mainly based on DCT (Discrete Cosine Transform). The compression ratio is generally less than 20 for fixed images and less than 80 for moving images. The increasing importance of the image in telecommunications requires the use of ever more intelligent compression techniques offering ever higher performance. Image compression is therefore one of the crucial features of future telecommunication tools.

The invention concerns such developments and applies in particular to development of the standard JPEG and MPEG techniques mentioned above.

There are many compression algorithms. They can be classified into a number of major families, respectively based on DCT, wavelet transformation, IFS fractals, vector quantification and quad-trees.

Each of these algorithms has its own advantages and disadvantages, depending on the type of image concerned, the required compression ratio and/or the required quality of image reconstruction. On the other hand, none of them can guarantee optimal results under all conditions.

The ideal would therefore be to be able to use all of these algorithms and to choose the most effective algorithm, depending on stated objectives, in each individual case.

However, an a priori knowledge of the most effective algorithm for given conditions and a given image is virtually impossible for a user, especially one who is not an image processing specialist. The problem is made worse by the fact that most of these algorithms necessitate adjustment of one or more parameters.

It is no more feasible to try all possible configurations (choice of algorithm+choice of parameters) for each image to be transmitted or stored.

Prior art compression systems therefore use a single type of compression algorithm. They nevertheless remain somewhat difficult to use because it is necessary to define one or more parameters.

What is more, the various systems operate on complete images but the inventors have found that in many situations only part of the image is of major interest.

One objective of the invention is to alleviate the various drawbacks of the prior art.

To be more precise, one objective of the invention is to provide a method of optimizing the compression of images and/or sequences of images capable of optimizing one or more criteria, or compression objectives, without necessitating from a user any analysis or any a priori choice.

In other words, the objective of the invention is to provide a method of the above kind that is accessible to any type of user, and in particular to users who are not image processing specialists, and which guarantees optimized compression regardless of the type of image and in accordance with objectives set by the user.

Another objective of the invention is to provide a method of the above kind that can assure optimized compression of a very large number of types of images, whatever the objectives set by the user (image quality or compression ratio).

SUMMARY OF THE INVENTION

The above objectives, and others that will emerge hereinafter, are achieved in accordance with the invention by a method of optimizing the compression of image data in accordance with at least one compression objective which includes:

an initialization phase including the steps of:
  compressing a plurality of test samples in accordance with at least two different compression conditions,
  associating with each of the test samples at least one item of information characteristic of the content of the sample and at least one measurement of the corresponding compression results, and
  establishing at least one reference function associating at least one of the compression objectives and/or at least one compression result measurement and/or at least one of the items of characteristic information for each of the compression conditions, and a selection phase including for each set of image data to be compressed the steps of:
  determining at least one item of information characteristic of the set of image data to be compressed, and
  selecting the optimal compression condition that maximizes at least one of the compression objectives in accordance with the item or items of characteristic information and the reference functions.

It is therefore possible to obtain adaptive compression, the optimal compression conditions being chosen automatically, without the user having to make any choices or to set any parameters, apart from indicating an objective for the compression to be effected. The method makes the choices itself, with reference to functions based on tests carried out during initialization.

A compression condition advantageously corresponds to a particular compression algorithm and/or to particular parameter values of a compression algorithm.

The compression algorithms can be selected from the group comprising:

algorithms based on the use of a frequency transform such as DCT, algorithms based on the use of a wavelet transform, algorithms based on the use of fractals or multi-fractals, algorithms based on the use of vector quantification, and algorithms based on the use of quad-trees.

The setting of parameters can involve at least one of the parameters selected from the group comprising:

a target compression ratio, a reconstruction error or a quality parameter or an error tolerance, a minimal number and/or a maximal number of subdivisions of a set of image data, and parameters intrinsic to a given compression algorithm.

The compression objectives are advantageously selected from the group comprising:

a reconstruction quality of the set of image data, an RMS error, a percentage of quality conserved, a compression ratio, a compression and/or decompression time, a transmission time, a compressed file size, and a symmetry of compression.

The compression result measurements can be selected from the group comprising:

a measurement of the reconstruction quality of the set of image data, and the compression ratio.

The measurement of reconstruction quality is, for example, selected from the group comprising:

a measurement of the RMS error between the set of source image data and the set of decompressed image data, a measurement of the maximum reconstruction error, a measurement of the signal to noise ratio, a measurement of the peak signal to noise ratio, and a psycho-visual quality measurement.

The characteristic information can be selected from the group comprising:

a measurement of the entropy of the set of image data, a measurement of the complexity of the set of image data, a measurement of the frequency power of the set of image data, and a measurement of the texturing of the set of image data.

In one particular embodiment of the invention the measurement of the complexity is a measurement on one dimension conforming to the formula:

$$\frac{1}{nbrow*(nbcol-1)} \sum_{i=1}^{nbrow} \sum_{j=1}^{nbcol-1} |x_{i,j} - x_{i,j+1}|$$

In another particular embodiment of the invention the measurement of the complexity is a measurement on two dimensions conforming to the formula:

$$\frac{1}{(nbrow-1)*(nbcol-1)} \sum_{i=1}^{nbrow-1} \sum_{j=1}^{nbcol-1} |2x_{i,j} - x_{i,j+1} - x_{i+1,j}|$$

The reference functions are preferably selected from the group comprising the functions of the following types:

quality measurement(s)=f(compression objective(s) and/or compression result measurement(s) and/or image characteristic(s)), compression objective(s)=f (compression condition(s) and/or image characteristic(s) and/or quality measurement(s)).

The reference functions can be expressed in at least one of the forms selected from the group comprising:

three-dimensional graphs, graphs, tables of values, mathematical functions, and decision rules.

The reference functions are advantageously obtained by the following steps:

analyzing compression results for each test sample and for each compression condition, and smoothing the analysis results.

The test samples and/or the image data can be of any type, for example:

images, portions or zones of images, series of similar images, and frequencies of moving images.

The selection step preferably also allows for at least one of the secondary criteria selected from the group comprising:

the size or the format of the set of image data, the brightness of the set of image data.

According to one advantageous feature of the invention the method includes a focusing step for selecting at least one portion in an image and/or at least one image in a sequence of images and/or an identical image portion in a sequence of images.

In this case two situations can arise:

at least one compression objective is fixed for the image portion or portions and/or at least one image in a sequence of images and/or an identical image portion in a sequence of images and at least one compression objective is fixed for the remainder of the image data; or at least one compression objective is fixed for the image portion or portions and/or at least one image in a sequence of images and/or an identical image portion in a sequence of images and for said set of image data.

The method of the invention can also include a step of continuous visualization of a set of image data being decompressed. A focusing step can then be effected on a set of image data being decompressed.

The plurality of test samples is advantageously chosen in accordance with one or more types of sets of image data and/or can be added to at any time.

According to another feature of the invention, making it simpler to use, the initialization phase includes a parameter definition step enabling uniform parameter values to be set, thereby associating the same reconstruction quality and compression ratio parameters with all compression conditions.

The selection phase preferably includes a conflict management step in the event of incompatibility between the compression objectives and/or in the context of implementation of the focusing step.

In one advantageous embodiment of the invention the method is in the form of a software toolbox including the following tools:

a selection tool implementing the selection step, at least two compression algorithms, and a focusing tool implementing the focusing step.

Other features and advantages of the invention will become more clearly apparent upon reading the following description of a preferred embodiment of the invention given by way of illustrative and non-limiting example only and from the appended drawings.

BRIEF DESCRIPTION OF THE DRAWINGS

FIGS. 4 to 6 show various three-dimensional graphs of the MQE=f(compression ratio, image complexity) type obtained during the initialization phase shown in FIG. 2.

DETAILED DESCRIPTION OF THE PREFERRED EMBODIMENTS

The embodiment described below by way of example concerns the compression of fixed images. It will be a simple matter for the skilled person to adapt this example to the compression of moving images or to particular types of images (satellite, medical, black and white, . . . ).

As already indicated, the main aim of the invention is to satisfy automatically the performance objective of a user of an image compression platform, whatever the nature of the image.

Figure 1:
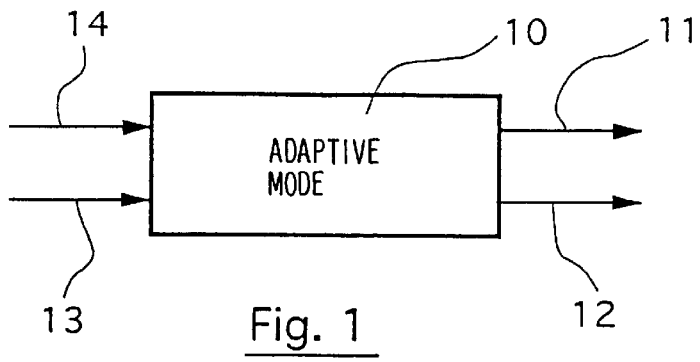
FIG. 1 illustrates the general principle of the invention.

FIG. 1 shows the general approach of the method of the invention. The method of the invention, or "adaptive mode", associates one of the available compression algorithms 11 and parameters 12 for that algorithm with each image 13, or to be more precise with the features of that image, in accordance with requirements 14 stated by the user.

The general principle of the method of the invention is described first. Detailed examples of various aspects are then described.

Figure 2:
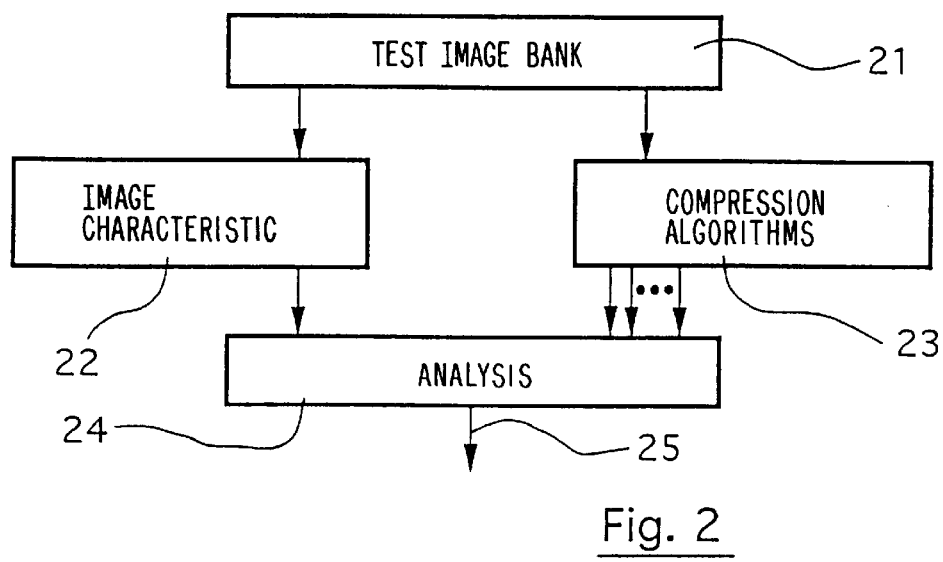
FIG. 2 is a simplified flowchart showing the initialization phase in accordance with the invention.
Figure 3:
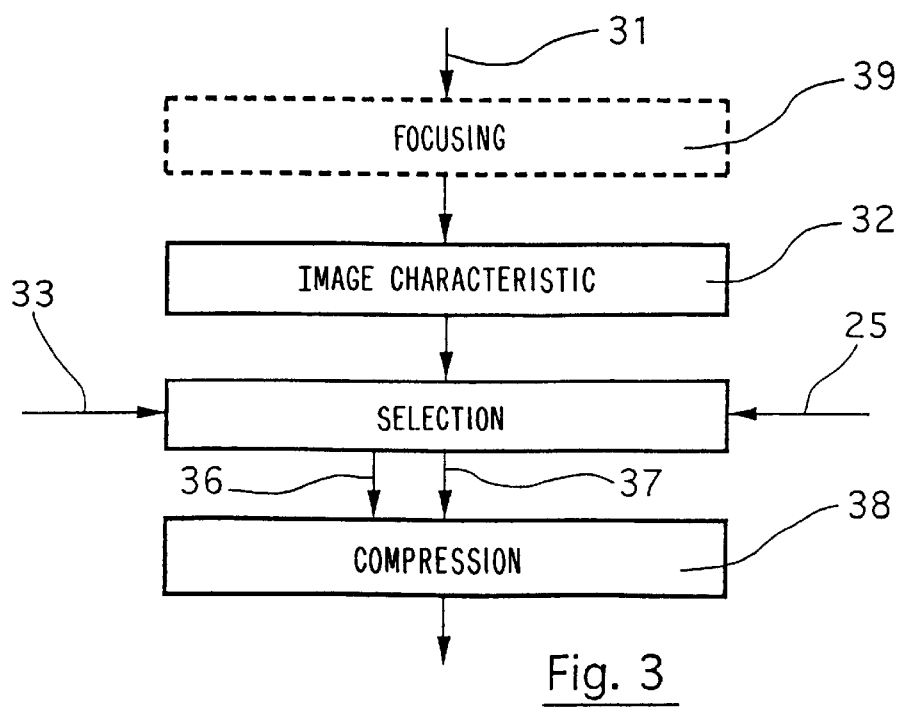
FIG. 3 is a simplified flowchart showing the selection phase in accordance with the invention.

The optimization method of the invention is in two separate phases: an initialization phase (illustrated in FIG. 2) and a selection phase (illustrated in FIG. 3).

The aim of the initialization phase is to define functions for associating with a given image, characterized by at least one item of characteristic information (for example complexity) and at least one compression objective (for example compression ratio or quality level), the best compression conditions, that is to say the most efficient algorithm and/or the best parameters for that algorithm, allowing for the objective of the user.

The selection functions can constitute associations between the various following parameters: compression objectives, information characteristic of the image (or on the image portion or image sequence) and compression conditions. They can be in form of three-dimensional graphs as shown in FIGS. 4 through 6, tables, mathematical functions and/or decision rules.

The initialization phase is illustrated in FIG. 2. A series of test images 21 is used (of course, references to images hereinafter are to be understood as encompassing portions of images and sequences of images and in particular moving images).

The test images are naturally chosen to cover the greatest possible diversity of images (tailored if necessary to a particular application). With each image there is associated (step 22) one or more items of characteristic information such as a complexity indicator. Each of the test images is compressed in parallel (step 23) using all of the available algorithms, and if appropriate with a number of parameter configurations.

Finally, the compression results (compression ratio and/or image reconstruction quality) are analyzed (step 24) to produce reference functions 25 used to select the optimal compression conditions in the selection phase.

The selection phase is illustrated in FIG. 3. With each image 31 to be compressed there is associated one or more items of characteristic information, in a similar fashion to step 22 already discussed.

Then, according to the objective 33 fixed by the user or a predetermined objective, characteristics 34 of the image and reference functions 25, compression conditions are selected (step 35) which designate a compression algorithm 36 and, where applicable, parameters 37 for that algorithm.

The image is then compressed (step 38) under optimal conditions without users having to fix the compression conditions themselves.

The tools used (section 1), the initialization phase (section 2) and the selection phase (section 3) of the preferred embodiment will now be described in more detail, together with various complementary aspects (section 4).

1. Tools Used 1.1 Compression Algorithms

As already indicated, there are several large families of algorithms, respectively based on DCT, wavelet transforms, IFS fractals, vector quantification and quad-trees.

In the embodiment described below an algorithm based on DCT (called JPEG hereinafter), an algorithm based on wavelets (called EZW or SHAPIRO hereinafter) and an algorithm based on fractals (called FISHER hereinafter) are used.

1.1.1 JPEG Algorithm

JPEG (Joint Photograph Expert Group) is the generic name for the standard compression algorithms described in ISO/IEC 10918-1.

The JPEG algorithm used corresponds to the "DCT based sequential mode, Huffman baseline" algorithm of the standard, which is a lossy compression algorithm. The general principle of the lossy JPEG compression algorithm is as follows:

take the next block of 8×8 pixels, calculate the Discrete Cosine Transform (DCT) of that block, divide each of the 8×8 coefficients obtained by a specific value (the table giving the value for each frequency is called the quantification table) and round off the result to the nearest integer, and apply entropic coding (which essentially consists in putting the quantified coefficients into a zig-zag order followed by Run Length Encoding (RLE) and then either Huffman or arithmetical coding).

1.1.2 SHAPIRO algorithm (EZW)

The name SHAPIRO designates another image compression algorithm based on wavelet transforms, invented and described by J. M. Shapiro.

The SHAPIRO algorithm pushes filtering by the wavelet transform to the final level (for which there remains only a coefficient equal to the result of successive convolution of the image with the low-pass filter, which is generally close to the average for the image). However, the essential novelty of the SHAPIRO algorithm lies in the organization and the coding of the coefficients obtained:

the coefficients are coded in decreasing magnitude order, that is to say the largest coefficients are coded first, independently of the frequency to which they correspond, and to finish, the sequences of symbols (corresponding to "positive", "negative", "negligible branch route" and "isolated zero") are subject to "on the fly" entropic coding of the adaptive arithmetical coding type.

1.1.3 FISHER Algorithm

The name FISHER designates a fractal image compression algorithm of the Iterated Function System (IFS) type described by Y. Fisher.

The general principle of IFS algorithms is to look for auto-similarities in the image to deduce therefrom a transform which on iteration converges towards a fixed point as close as possible to the original image.

In more concrete terms the steps of IFS compression are as follows:

choose a "non-overlapping" partition of the image (a set of regions in which all the two by two intersections are empty, but the union of which constitutes the entire image), for each region of the partition, look in the image for a larger "domain" and a contracting transform such that the transform of the domain is as similar as possible to the region, and code the parameters of the transforms "cleverly" and if applicable apply entropic coding to them.

The size of the IFS compressed data is equal to the number of regions in the partition multiplied by the number of bits necessary to code the parameters of each pair (domain, transform), and where applicable divided by the compression ratio obtained by a final phase of entropic coding.

1.1.4 Other Algorithms

Many other algorithms can be used such as the TETRA algorithm based on quad-tree image coding, the EPIC (Efficient Pyramid Image Coder) algorithm based on wavelet transforms, no-loss algorithms, etc.

1.2 Reconstruction Quality

Many criteria can be envisaged for measuring the quality of reconstruction, possibly used in combination:

1.2.1 RMS Error

The RMS Error between the source image and the reconstructed image is a statistical measurement of error given by the following formula:

$$\frac{1}{(nbrow)*(nbcol)} \sum_{i=1}^{nbrow} \sum_{j=1}^{nbcol} (x_{i,j} - \bar{x}_{i,j})^2$$

This error translates the error power between the source and decompressed images. Minimizing the RMS error is a basic criteria of many compression algorithms. However, the RMS error can be a poor indication of the subjective quality of reconstruction, not allowing for the reaction of the eye to the visibility of defects. This being said, in general an image with a high RMS error shows more distortion than one with a lower RMS error.

Moreover, the RMS error has a relative digital stability that is of benefit in the case of performance comparison, for tracking the evolution of the error as a function of other factors.

1.2.2 Psycho-visual Criteria (ICM)

IQM is the name of a psycho-visual approach to measuring image distortion.

The quality of a coding system is ideally measured by the subjective quality of the reconstructed image obtained by decoding. Unfortunately there is as yet no universal measurement of quality. On the one hand quality depends on the application and on the other hand it must allow for the still imperfectly defined properties of the human visual receptor.

Nevertheless, the quality scale used for professional imaging in television will be used. This scale is quantified into five levels of visible degradation:

1: imperceptible,

2: perceptible but not irritating,

3: slightly irritating,

4: irritating, and

5: very irritating.

The approach is for non-specialists to analyze the original images and then the reconstructed images from a psycho-visual point of view. The viewing distance varies in the range four times to six times the screen height (4 H or 6 H). A coding technique is deemed satisfactory for an average score of 4.5 at 6 H.

The following procedure is recommended: the first task is to choose test images that are highly specific to the application, in collaboration with operational experts. The results are then validated from the subjective point of view with non-specialists and then experts.

Many researchers have attempted to define a psycho-visual measurement model. We have chosen IQM as being the most comprehensive and having the best correlation with visual impression, based on tests carried out by the original authors and confirmed by our own experiments.

It was initially developed for aerial image applications with the aim of qualifying image quality absolutely, to determine whether an image is usable or not. We have therefore adapted it to apply it to the reconstruction calculation between an initial image and an image reconstructed after compression-decompression.

A function of the above kind provides a measurement that takes better account of the perception of degradation by the human eye. However, it does not give any relationship between the values of this measurement and the above perceptual scale. Establishing this relationship is a remaining task for future work on the adaptive mode. This having been said, the problem can be circumvented because in most cases the specification of the quality criteria in the context of a compression will be effected in the context of focusing and will concern the quality of some areas of the image relative to others. The relative IQM values from the different areas can therefore be used without relating them in any absolute way with the perceptual scale previously mentioned.

1.2.3 Other Criteria

There are other statistical measurements that can be used, fairly close to or derived from RMS error, such as the maximum reconstruction error, the signal-to-noise ratio or the peak signal-to-noise ratio.

1.3. Image Characterization 1.3.1 1D Complexity

This parameter is an estimate of complexity used in particular in the regulation system of the JPEG-based SPOT5 algorithm.

The complexity is the mean of the differences between each pixel and its immediate lefthand neighbor. Although it is highly unsophisticated, this criterion takes good account of local regularity of an image and therefore to some degree of its texture.

The formula for obtaining the complexity of an image is as follows:

$$\frac{1}{nbrow*(nbcol-1)} \sum_{i=1}^{nbrow} \sum_{j=1}^{nbcol-1} |x_{i,j} - x_{i,j+1}|$$

1.3.2 2D Complexity

The complexity criterion mentioned above is the one we have found to be most reliable in our preliminary experiments. This reliability is reflected in the accuracy of the three-dimensional graphs used for JPEG compression.

As already stated, the criterion is somewhat rudimentary and in particular takes account of differences between pixels only in the horizontal direction.

It would therefore be desirable to consider a similar but bidirectional criterion, for example:

$$\frac{1}{(nbrow-1)*(nbcol-1)} \sum_{i=1}^{nbrow-1} \sum_{j=1}^{nbcol-1} |2x_{i,j} - x_{i,j+1} - x_{i+1,j}|$$

1.3.3 Entropy

The entropy of a file, as defined by the following formula, is the number of bits needed to represent the file:

$$H - \sum_{i=0}^{255} p_i \log_2(p_i)$$

Although the number of bits used to store a computer file is systematically 8 bits per character, in principle this number of bits can be reduced to that indicated by the entropy. This is the objective of entropic coding such as Huffman coding.

From a point of view close to the image, a low entropy is characteristic of the fact that the pixels take a small number of values in the range [0,255]. This is in principle representative of the information contained in the image and of the difficulty of compressing it, in that if the pixels take a small number of values, variations of intensity should be relatively infrequent.

In practise this is not necessarily so (an image could use only two pixel values, present alternately, and such an image would be more difficult to code than an image containing more pixel values, concentrated in uniform areas).

1.3.4 Frequency Power

The frequency power is the mean value of the image power spectrum. The power spectrum is itself defined as the modulus of the Fourier transform of the image:

$$|F(u,v)| = [R^2(u,v) + I^2(u,v)]^{1/2}$$

where the Fourier transform of the image $$|F(u,v)| = F\{f(x,y)\} = \int_{xmin}^{xmax} \int_{ymin}^{ymax} f(x,y) e^{-j2\pi ux} e^{-j2\pi vy} dx\, dy$$

is represented in the modulus/phase form:

$$F(u,v) = R(u,v) + jI(u,v)$$

1.3.5 Other Criteria

Equally feasible are the use of:

criteria using DCT: it can also be beneficial to consider a criterion using the frequency representation of the image to evaluate its contents, and a criterion of this kind can be constructed using a block DCT that renders its values particularly favorable for evaluating the ease of compressing the image using JPEG, and criteria using wavelet transforms: it can also be beneficial to consider a criterion using wavelet transforms, for example by calculating the entropy of the wavelet coefficient resulting from the transform of the image.

A criteria of this kind would be capable a priori of allowing for the ease of compressing the image with an algorithm using wavelets.

2. Initialization Phase

2.1 Principle

As indicated above, the invention is based on the use of three-dimensional graphs (or rules, functions, tables, . . . ) based on analyzing the results of compressing a set of test images.

2.2 Test Images

In the example under discussion a base of 50 images was used, divided into three categories:

natural images: images of everyday scenes such as faces, animals, landscapes, aerial images: aerial views taken under operational conditions with different resolutions, including photos of industrial, residential and harbor areas, and satellite images: SPOT images covering urban, agricultural and mountainous areas.

2.3 Production of Three-dimensional Graphs

2.3.1 Principle

Each of the above images is compressed using all the algorithms. Depending on the compression results, three-dimensional graphs of the following types are generated:

quality measurement(s)=f(compression objective(s) and/or compression result measurement(s) and/or image characteristic(s)), and compression objective(s)=f(compression condition(s) and/or image characteristic(s) and/or quality measurement(s)).

The principle is therefore to study the variations in the reconstruction error (RMS error or IQM) according to the compression ratio achieved and according to the statistical criterion.

The statistical criterion varies on working through the test image base. It is then possible to see if the evolution of the error as a function of the criterion at constant compression ratio follows no particular law or, to the contrary, features a monotony and irregularity that can be interpreted and used to control the adaptive mode.

The graphs can be used directly as digital data to predict the behavior of a given algorithm for a given image.

In that they are already sufficiently regular, the graphs can be smoothed, for example using spline functions, to eliminate variations due to the test base used.

The graphs also identify the algorithm deemed to be the best for a given image on the basis of the value of the statistical criterion or criteria used.

2.3.2 Examples

One or more of the following three-dimensional graphs, stated here by way of non-limiting example, can be used:

RMS error=f(compression ratio, complexity of the set of image data),

RMS error=f(compression ratio, entropy of the set of image data),

RMS error=f(compression ratio, frequency power of the set of image data), psycho-visual quality=f(compression ratio, complexity of the set of image data), RMS error=f(compression ratio, size of the set of image data), RMS error=f(compression ratio, brightness of the set of image data), compression ratio=f(compression algorithm parameter, complexity of the set of image data), RMS error=f(compression algorithm parameter, complexity of the set of image data), compression ratio=f(complexity of the set of image data), compression ratio=f(entropy of the set of image data), etc.

Note that the last two examples concern lossless compression algorithms for which the only problem is to predict the compression ratio that will be obtained for a given image.

FIGS. 4 through 6 are examples of such three-dimensional graphs, after smoothing. They are graphs of the RMS error=f(compression ratio, complexity of the image) type.

3. Selection Phase 3.1 Requirements and Uses 3.1.1 Example: Nine Parameter Setting Modes In the example described the adaptive mode contains nine parameter setting modes corresponding to possible compression objectives for a user.

The objectives can be classified into three categories:

1. Specifying directly the algorithm and its parameter or parameters: this objective concerns only persons having sufficient knowledge of the algorithm to wish to use it directly, so this type of parameter setting must continue to be available, but is evidently not the most interesting of those that an adaptive mode can provide, 2. Specifying a parameter that is equivalent to a ratio: this concerns parameters that specify more or less directly the size of the file obtained after compression, whether this is via this size, the ratio (as a ratio or as a bit-rate), a transmission time at a given bit-rate, etc, and 3. Specifying a parameter that is equivalent to a reconstruction error: this is a parameter that specifies more or less directly the error between the original image and the compressed image. It can be a keyword specifying the quality to be preserved, a digital error measurement to be achieved, etc.

The parameter setting possibilities given to the user are listed below. However, the addition of a further possibility suited to a specific need always remains possible and a priori simple, as in principle all that is necessary is to translate this parameter into a target ratio or a target error.

Specifying an Algorithm

A1 algorithm and parameter: the algorithm is one of two available algorithms and the meaning and the field of definition of the parameter are related to it.

Specifying a Compression Ratio or Equivalent Parameter

T1 compression ratio: the compression ratio is the ratio between the size of the original image and that of the file after compression. This number must be greater than 1.

T2 size of compressed file: this is the size of the file on leaving the compression algorithm. It must be less than the size of the original image. The size is specified in bytes, for example.

T3 transmission time: this is the time to transfer the image across a network. The time is meaningless unless associated with a network bit rate. The two numbers must be greater than zero. The time is specified in seconds, for example, and the bit rate in bits per second, which correspond to the usual network conventions.

Specifying a Reconstruction Error or Equivalent

Q1 target RMS error: this is the RMS error required between the original image and the reconstructed image. This is a real number greater than zero.

Q2 reconstruction quality: this involves specifying the quality of the image obtained after compression and decompression expressed by means of keywords. The keywords are:

perfect, excellent, good, acceptable, poor.

Q3 percentage quality preserved: this is a percentage for varying the output quality uniformly (and therefore continuously, unlike the above keywords) between 100% (impeccable quality) and 0% (maximal degradation of the image).

Additionally the parameters T1, T2, T3, Q1, Q2 and Q3 can be associated with the requirement for an algorithm with which the specified objective must be achieved. In that a target rate or error can be achieved with any algorithm through uniform parameter setting, this does not raise any particular problem. In this case the native parameter of the algorithm is naturally not specified.

Moreover, in the context of the embodiment described, specifying one of these objectives leads to updating of all the other fields to maintain the consistency of parameter settings in the various elements of the interface. This updating is effected:

between parameters of the same kind (T1 to T2, etc), and between parameters of different kinds (A1 to T1, T1 to Q1 etc), using the three-dimensional graphs to evaluate either the RMS error obtained with a given algorithm and its parameter or the ratio obtained for the specified RMS error or vice versa.

3.1.2 Automatic Compromise

In addition to these usage scenarios, it is beneficial to have a parametering mode in which the user does not give any particular objective and for which the adaptive mode itself must find the best compromise between compression ratio and output quality.

This compromise can consist in:

selecting the process obtaining the best compression ratio for an output quality deemed to be satisfactory (for example corresponding to the above "excellent" or "good" criterion), and selecting the method obtaining the best ratio of the compression ratio obtained to the RMS error obtained by an overall optimization based on the graphs for all possible algorithms and all the possible modes of parameter setting.

3.1.3 Conflict Management

There are two types of parameter setting conflict:

association of incompatible parameters: for example, specifying a compression ratio and a quality to be achieved for the compression of a given image, and in the context of focusing (see below), incompatible parameters between areas and the image background (typically, when the volume of data corresponding to the compressed areas no longer enables a particular compression ratio to be achieved for the whole of the image).

3.2 Choice of Optimal Compression Conditions
3.2.1 Reduction of User Parameters Before choosing the compression method proper, it is necessary to go from the objectives of the user to the two underlying parameters that can be controlled using three-dimensional graphs, namely a compression ratio or a reconstruction error expressed in the form of an RMS error.

The following conversions are therefore effected:

A1 algorithm and parameter: no transition is to be done, the objective is usable directly for parameter setting.

T1 compression ratio: no transition is to be done, the objective is usable directly for parameter setting.

T2 size of compressed file: depending on the algorithms, the number of bytes required for the compressed file can be used directly as a parameter (for example for EZW).

T3 transmission time: from a transmission time t in seconds on a network and the bit rate D in bits per second of that network it is possible to deduce the target compression ratio Tx to be achieved for an image whose original size in bytes is known.

Q1 target RMS error: no transition is to be done, the objective is usable directly for parameter setting.

Q2 reconstruction quality: the five keywords below have been chosen in line with standard practise in the literature and so that each corresponds to one step in the perception of image quality.

Perfect: no loss on compression. Implies the use of lossless compression.

Excellent: no visible degradation in the image. There can be errors identifiable by digital measurements such as the RMS error, but a human observer viewing the image at its original size and resolution must not be able to detect them.

Good: a user viewing the image attentively can make out the distortion, but the latter must remain discrete and non-irritating.

Acceptable: clearly visible degradation can be seen without viewing the image attentively. The scene must remain recognizable.

Poor: the scene is degraded overall, and is no longer necessarily recognizable. Only the general form remains and can possibly serve as a background to indicate the context in the context of focusing.

Q3 percentage quality conserved: it is useful to be able to indicate the required output quality as a percentage.

3.2.2 Choice of Algorithm

When the objectives of the user have been reduced to obtaining a target compression ratio or a target RMS error, the algorithm to be used is determined by finding, for the image:

if there is a target compression ratio, the algorithm that gives the RMS error for an image having the complexity of the input image, if there is a target RMS error, the algorithm that gives the highest compression ratio for an image having the complexity of the input image, or if global optimization is requested, the algorithm that gives the best compression ratio for a quality deemed acceptable (to be defined) or which gives the best ratio of the compression ratio obtained to the RMS error obtained.

The RMS error obtained at a given compression ratio or the compression ratio associated with the target RMS error for the current image is predicted using the three-dimensional graphs:

$$\text{RMS error} = f(\text{ratio, complexity})$$

generated for each algorithm, as shown in FIGS. 4 through 6:

if there is a target compression ratio look for the RMS error corresponding to the coordinates (ratio, complexity) on the graph, if there is a target RMS error, look for the value of the compression ratio to which is necessary to compress an image whose complexity is that of the input image to obtain this RMS error.

The three-dimensional graphs are based on the experiments mentioned above and smoothed using spline functions.

For algorithms using an inherent parameter different from the compression ratio and the RMS error (JPEG, FISHER, SHAPIRO) there is an alternative method using other three-dimensional graphs to sort the results or to take the method that gives the most precise estimates. In this case the following are used:

$$\text{ratio} = f(\text{parameter, complexity})$$

and $$\text{RMS error} = f(\text{parameter, complexity})$$

To determine the RMS error corresponding to a required ratio for an image of given complexity the first step is to use the first three-dimensional graph to find the inherent parameter of the algorithm that must be used to obtain this ratio. The RMS error obtained with that parameter is then determined using the second three-dimensional graph.

A similar procedure in employed to find the ratio corresponding to a required RMS error, using the second and then the first three-dimensional graphs in succession.

4. Additional
4.1 Three-dimensional Graph Optimization

The experimental data on which the results described above are based, essentially in the form of the three-dimensional graphs used, were obtained and integrated manually.

The three-dimensional graphs were determined from a base of 50 images and the quality criteria from visual tests carried out with 10 images, which corresponds to the desire for a prototype validating the principle of the adaptive mode and usable as a demonstration platform but is insufficient for robust use in an operational environment.

Evolution of the system as a whole therefore presupposes integrating into it the process of generating and updating this data, in order to be able to:

update the three-dimensional graphs with improved versions, resulting from new experiments or from ad hoc manipulation of their content (such improvements and updates must be of a kind that can be done by system designers and by users, in particular to enable users to produce three-dimensional graphs characteristic of images specific to their needs and of which they have large numbers), and add or modify user parameter reduction methods (network parameters, quality criteria, etc) to adapt to particular contexts of use.

4.2 Focusing

The selection phase can advantageously cooperate with a focusing step 39 (FIG. 3) which can be presented as an independent "tool". Focusing in accordance with the invention consists in selecting one or more preferred areas in an image or in a sequence of images and requiring enhanced processing for those areas (or, conversely, degraded processing for the remainder of the images).

For a given size of file, this makes it possible to obtain a very high image quality for the zone in question. This can be a particular element compared to the background of the image, for example, or the face (or just the mouth) of a speaking person in a videophone application.

Two objective definition strategies can be implemented:

- at least one compression objective is set for the image portion or portions and/or at least one image in a sequence of images and/or an identical image portion in a sequence of images together with at least one compression objective for the remainder of the image data, or
- at least one compression objective is fixed for the image portion or portions and/or at least one image in a sequence of images and/or an identical image portion in a sequence of images and for the set of image data.

The method advantageously further includes continuous visualization of the images during decompression with a sharpness increasing with the compression ratio. In this case focusing can also enable an area to be selected in the image being decompressed. Only this area will then be delivered with enhanced quality.

4.3 Taking Account of Other Information

In addition to the various aspects already considered, the operations of selecting compression conditions can be optimized by allowing for various ancillary parameters that are pertinent to the efficacy of at least some algorithms, such as the image size and format, the brightness of the image, etc.

Other aspects can also be taken into account such as the compression and decompression times (and their ratio) and robustness vis-à-vis transmission errors.

4.4 Improving Prediction Accuracy

To improve prediction accuracy further it is possible to enhance the performance of the three-dimensional graphs by modifying them using various processes such as:

extensions by continuity, or adding a positive or negative constant to favor or to defavor a particular algorithm.

4.5 Toolbox

The method of the invention can be implemented in the form of a toolbox made up of independent software entities that can cooperate, including:

a selection tool (the reference functions can be predefined, adapted to the needs of the user and/or defined by the user, using their own test image bank), a plurality of compression algorithms (the choice of algorithms can be tailored to the needs of the user), a focusing tool, a continuous visualization tool, etc.

There is claimed:

1. A method of optimizing the compression of image data in accordance with at least one compression objective including:

an initialization phase including the steps of:

compressing a plurality of test samples in accordance with at least two different compression conditions, associating with each of said test samples at least one item of information characteristic of the content of said sample and at least one measurement of the corresponding compression results, and establishing at least one reference function associating at least one of said compression objectives and/or at least one compression result measurement and/or at least one of said items of characteristic information for each of said compression conditions, and a selection phase including for each set of image data to be compressed the steps of:

determining at least one item of information characteristic of said set of image data to be compressed, and selecting the optimal compression condition that maximizes at least one of said compression objectives in accordance with said item or items of characteristic information and said reference functions.

2. A method as claimed in claim 1 wherein a compression condition corresponds to a particular compression algorithm and/or to particular parameter values of a compression algorithm.

3. The method claimed in claim 2 wherein said compression algorithms are selected from the group comprising:

algorithms based on the use of a frequency transform such as DCT, algorithms based on the use of a wavelet transform, algorithms based on the use of fractals or multi-fractals, algorithms based on the use of vector quantification, and algorithms based on the use of quad-trees.

4. The method claimed in claim 2 wherein said parameter setting comprises the setting of at least one of the parameters selected from the group comprising:

a target compression ratio, a reconstruction error or a quality parameter or an error tolerance, a minimal number and/or a maximal number of subdivisions of a set of image data, and parameters intrinsic to a given compression algorithm.

5. The method claimed in claim 1 wherein said compression objectives are selected from the group comprising:

a reconstruction quality of the set of image data, an RMS error, a percentage of quality conserved, a compression ratio, a compression and/or decompression time, a transmission time, a compressed file size, and a symmetry of compression.

6. The method claimed in claim 1 wherein said compression result measurements are selected from the group comprising:

a measurement of the reconstruction quality of the set of image data, and the compression ratio.

7. The method claimed in claim 6 wherein said measurement of reconstruction quality is selected from the group comprising:

a measurement of the RMS error between the set of source image data and the set of decompressed image data, a measurement of the maximum reconstruction error, a measurement of the signal to noise ratio, a measurement of the peak signal to noise ratio, and a psycho-visual quality measurement.

8. The method claimed in claim 1 wherein said characteristic information is selected from the group comprising:

a measurement of the entropy of the set of image data, a measurement of the complexity of the set of image data, a measurement of the frequency power of the set of image data, and a measurement of the texturing of the set of image data.

9. The method claimed in claim 8 wherein said measurement of complexity is a measurement on one dimension conforming to the formula:

$$\frac{1}{nbrow*(nbcol-1)} \sum_{i=1}^{nbrow} \sum_{j=1}^{nbcol-1} |x_{i,j} - x_{i,j+1}|$$

10. The method claimed in claim 8 wherein said measurement of complexity is a measurement on two dimensions conforming to the formula:

$$\frac{1}{(nbrow-1)*(nbcol-1)} \sum_{i=1}^{nbrow-1} \sum_{j=1}^{nbcol-1} |2x_{i,j} - x_{i,j+1} - x_{i+1,j}|$$

11. The method claimed in claim 1 wherein said reference functions are selected from the group comprising the functions of the following types:

quality measurement(s)=f(compression objective(s) and/or compression result measurement(s) and/or image characteristic(s)), compression objective(s)=f(compression condition(s) and/or image characteristic(s) and/or quality measurement(s)).

12. The method claimed in claim 1 wherein said reference functions are expressed in at least one of the forms selected from the group comprising:

three-dimensional graphs, graphs, tables of values, mathematical functions, and decision rules.

13. The method claimed in claim 1 wherein said reference functions are obtained by the following steps:

analyzing compression results for each of said test samples and for each of said compression conditions, and smoothing the results of said analysis.

14. The method claimed in claim 1 wherein said test samples and/or said sets of image data are selected from the group comprising:

images, portions or zones of images, series of similar images, and frequencies of moving images.

15. The method claimed in claim 1 wherein said selection step also allows for at least one of the secondary criteria selected from the group comprising:

the size or the format of the set of image data, the brightness of the set of image data.

16. A method as claimed in claim 1 including a focusing step for selecting at least one portion in an image and/or at least one image in a sequence of images and/or an identical image portion in a sequence of images.

17. The method claimed in claim 16 wherein at least one compression objective is fixed for said image portion or portions and/or at least one image in a sequence of images and/or an identical image portion in a sequence of images and at least one compression objective is fixed for the remainder of the image data.

18. The method claimed in claim 16 wherein at least one compression objective is fixed for said image portion or portions and/or at least one image in a sequence of images and/or an identical image portion in a sequence of images and for said set of image data.

19. A method as claimed in claim 1 including a step of continuous visualization of a set of image data being decompressed.

20. The method claimed in claim 16 wherein said focusing step can be effected on a set of image data being decompressed.

21. The method claimed in claim 1 wherein said plurality of test samples is chosen in accordance with one or more types of sets of image data and/or can be added to at any time.

22. The method claimed in claim 1 wherein said initialization phase includes a parameter definition step enabling uniform parameter values to be set thereby associating the same reconstruction quality and compression ratio parameters with all said compression conditions.

23. The method claimed in claim 1 wherein said selection phase includes a conflict management step in the event of incompatibility between said compression objective and/or in the context of implementation of said focusing step.

24. A method as claimed in claim 16 in the form of a software toolbox including the following tools:

a selection tool implementing said selection step, at least two compression algorithms, and a focusing tool implementing said focusing step.

* * * * *